June 14, 1960 H. J. McCREARY 2,941,189

MAGNETIC MEMORY APPARATUS

Filed July 19, 1955

3 Sheets-Sheet 1

INVENTOR.
HAROLD J. M^C CREARY

BY Wm Walter Ouzw.

ATTY.

June 14, 1960 H. J. McCREARY 2,941,189

MAGNETIC MEMORY APPARATUS

Filed July 19, 1955

3 Sheets-Sheet 2

INVENTOR.
HAROLD J. McCREARY
BY Wm. Watts Darw.
ATTY.

INVENTOR.
HAROLD J. MC CREARY

BY Wm. Walter Owen.

ATTY.

2,941,189

MAGNETIC MEMORY APPARATUS

Harold J. McCreary, Lombard, Ill., assignor to Automatic Electric Laboratories, Inc., a corporation of Delaware Filed July 19, 1955, Ser. No. 522,968

4 Claims. (Cl. 340—174)

Figure 2:
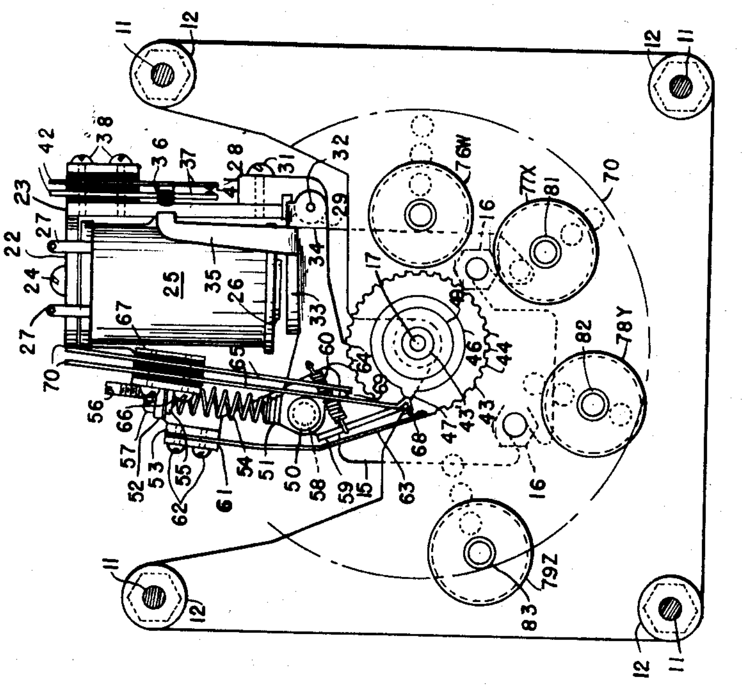

This invention relates generally to magnetic memory devices in which information may be stored by means of magnetic representations induced therein. More particularly this invention relates to improvements in such magnetic memory devices in which the dynamic effect of the induced magnetic representations is employed to operate associated mechanical apparatus in accordance with the representations. A memory device of the general character contemplated in the present invention and over which the present invention represents an improvement constitutes an essential element of the circuit arrangement described in my copending application Ser. No. 521,689, filed July 13, 1955.

Essentially, in the embodiment of my invention to be specifically described herein, a mosaic of magnetic elements is provided which element may, by the application of a suitable inducing flux, be magnetized in a particular polarity. In the particular embodiment to be considered the said magnetic elements are arranged about a common axis, in radial rows and in concentric circles, and, by the proper control of the application of the inducing flux, patterns or combinations of magnetizations of the said particular polarity can be produced in the magnetic element mosaic. Thus in the present embodiment the elements of each radial row may be magnetized in said particular polarity in $2^n—1$ combination where $n$ represents the number of magnetic elements in each radial row. The number of discrete combinations each of which may be representative of information to be stored is limited only by the number of radial rows extending from the axis.

The magnetizations of the particular polarity induced in the magnetic elements can be effectively utilized through the tractive force exerted by the said magnetizations to conveniently operate suitable associated mechanical apparatus. This principle is applied in the present invention to accomplish the operation of a plurality of contacting means such that the said operation represents a translation into mechanical motion of the combinations of magnetizations in the magnetic elements. Thus, in the present invention the application of the inducing flux is controlled to introduce into my memory device information to be stored in the form of combinations of magnetizations of a particular polarity in the magnetic element mosaic, which combinations may, after a selected interval, be "readout" in the form of selective mechanical operations of individual ones of the said plurality of contacting means.

Accordingly, it is the primary object of my invention to provide a new and improved magnetic memory arrangement in which magnetizations representative of stored information induced therein are employed to operate after a selected lapse of time, by means of the magnetic tractive force exerted, mechanical apparatus associated therewith in accordance with the information stored.

It is also an object of this invention to provide a magnetic memory arrangement in which the basic storage medium comprises a new and novel mosaic of magnetic elements each of which magnetic elements can be individually magnetized in a particular polarity, the patterns of magnetizations formed by the individually magnetized elements representing the information stored in the memory arrangement.

Another object of this invention is the provision of a magnetic memory arrangement capable of performing the functions described in the preceding paragraphs by means of structure and organization which represent substantial improvements and advantages in terms of simplicity of manufacture, economy and compactness, over similar magnetic memory arrangements heretofore known.

Still a further object of this invention is the provision in a magnetic memory arrangement of a basic storage medium, the elements and operating components of which are so arranged as to derive the maximum dynamic effect from minimal magnetizations induced in the storage medium, thus insuring positive and reliable operation of the arrangement.

Figure 1:
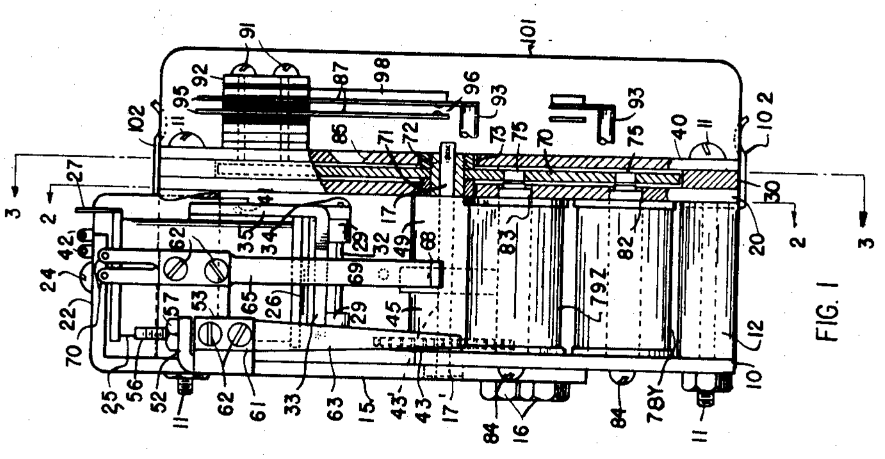
Figure 3:
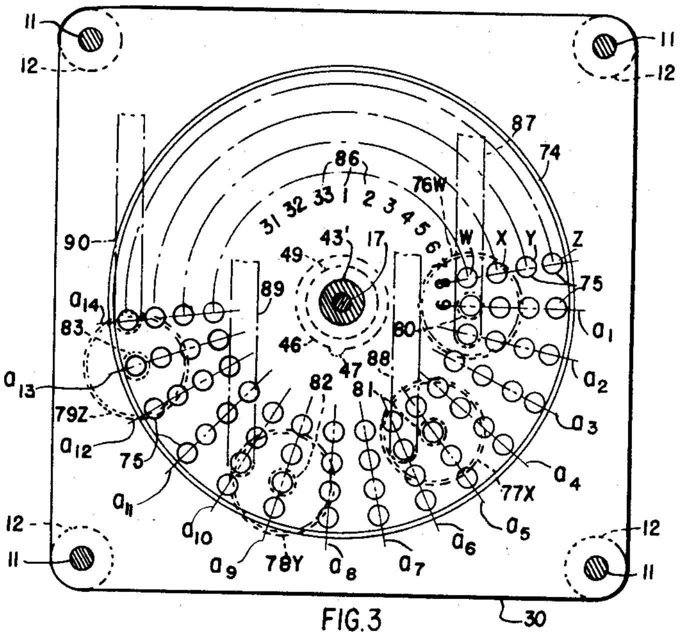
Figure 4:
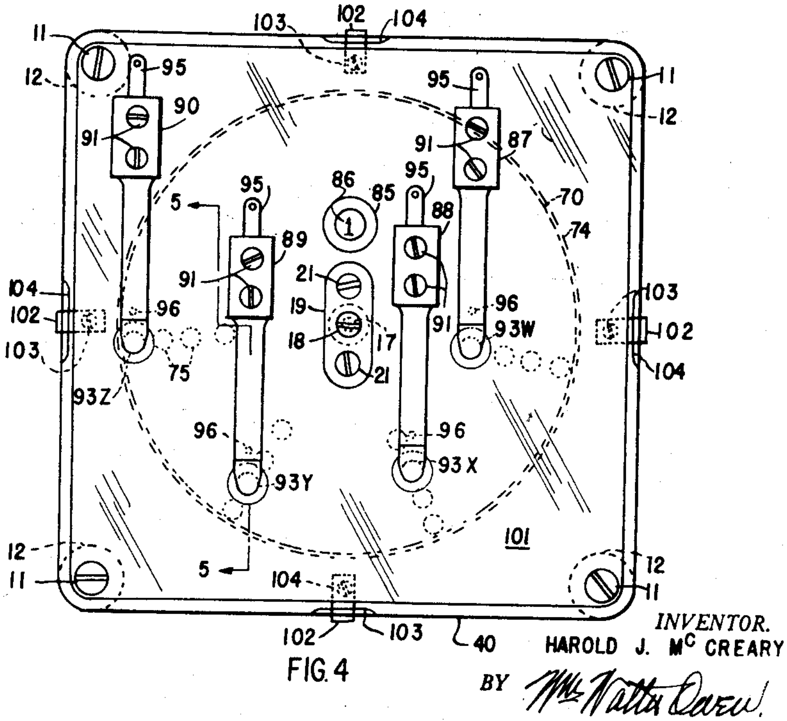
Figure 5:
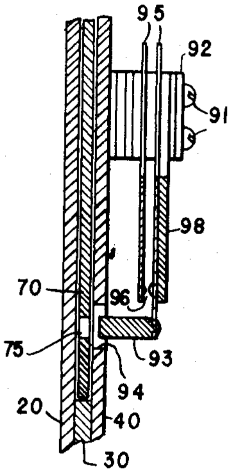

The structural organization and arrangement of my invention will be best understood from a consideration of the detailed description of a preferred embodiment taken with reference to the accompanying drawings of which:

Fig. 1 represents a side elevation of the memory arrangement with portions of the retaining members broken away to more clearly show the relation of the magnetizing or "write-in" heads with two of the magnetic elements of the storage mosaic and the stepping mechanism subassembly, Fig. 2 shows a plan view of a section of my arrangement taken along the line 2—2 of Fig. 1 and is intended to show the details of the stepping mechanism for rotating the storage medium and the relative positions of the magnetizing head with respect to the axis of the storage medium. In addition the cut-away portion of the base plate for providing clearance for the operating elements of the stepping mehcanism is clearly shown, Fig. 3 shows a plan view of a section of my arrangement taken along the line 3—3 of Fig. 1 and is intended to show the relation of the storage mosaic and the enclosing intermediate plate. Shown here also in broken lines are the relative positions of the magnetizing or "write-in" heads, certain of the magnetic elements of the storage mosaic, and the "read-out" means, Fig. 4 shows a view of my arrangement taken from the right of Fig. 1 and is intended to show the plurality of "read-out" contacting means. A transparent dust-cover shown also in Fig. 1 is clearly shown together with clip means for retaining the cover in position, Fig. 5 is a partial section view of one of the plurality of "read-out" contacting means taken, along the line 5—5 of Fig. 4 and shows the relation of the contacting member with one of the magnetic elements of the storage mosaic.

Figure 5A:
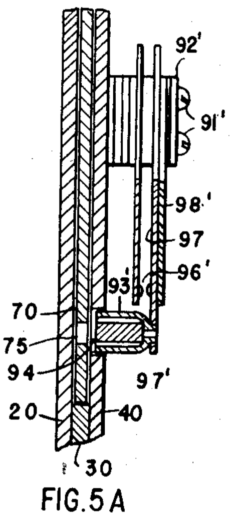
Figure 6:
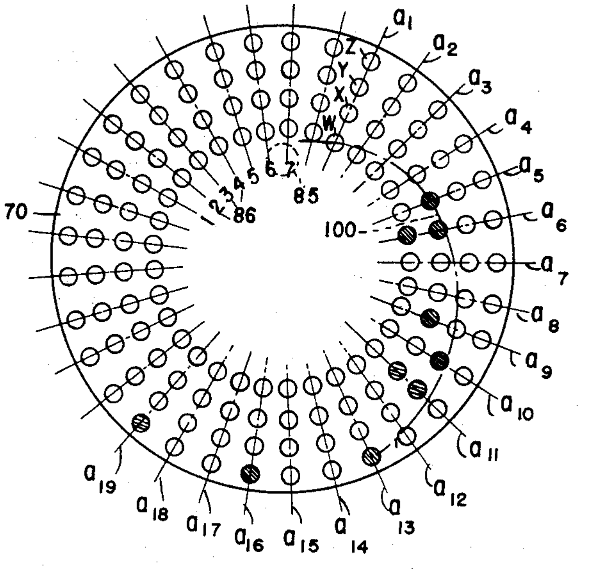

Fig. 5A is another partial section view of one of the plurality of "read-out" contacting means also taken along the line 5—5 of Fig. 1 and is intended to show an alternate structure for achieving effective utilization of the tractive force exerted by magnetizations in the elements of the storage mosaic, and, Fig. 6 is a diagrammatic representation of the storage mosaic of the instant preferred embodiment of my invention which shows all of the elements of the storage mosaic and in which, by means of appropriate shading of certain elements to represent magnetizations of said particular polarity, illustrative information in the form of a seven-digit number has been magnetically stored.

Referring to the various figures of the drawings the preferred embodiments of my invention will now be considered in detail. The separate elements and components of my invention are maintained in their proper relationship by means of a succession of supporting plates 10, 20, 30 and 40. The said plates, of a substantially square configuration, are held in a spaced relationship by four clamping screw means, such as the screws 11, passing through suitable holes provided therefor at each of the corners of the said plates. The base plate 10 and the lower intermediate plate 20 are spaced apart by means of bushings 12 through which the screw means 11 are passed. The screw means 11 are secured to clamp the intermediate plates 20 and 30 and bushings 12 between the bottom plate 10 and the top plate 40 to form a rigid framework within which the components of the memory are assembled.

A secondary mounting frame 15 is provided upon which the elements of the sub-assembly constituting the stepping mechanism for the memory are mounted. The frame 15 in turn is rigidly mounted on the under side of the base plate 10 by the screw means 16 or by any other convenient means permitting the detachment of the stepping mechanism sub-assembly. Extending perpendicularly from the frame 15 and passing perpendicularly through the planes of the plates 10, 20, 30 and 40, is a shaft 17. The shaft 17 is pressed at one extremity into a shouldered bushing 17′, which bushing 17′ is rigidly mounted in the frame 15 in any convenient manner such as by riveting, the shaft 17 being positioned in its perpendicular axis substantially equi-distant from the axes of the bushings 12. The rigid shaft 17, at its opposite extremity extends beyond the surface of the top plate 40 and is drilled and tapped at this extremity to receive a retaining screw 18 as shown in Fig. 4. An adjusting plate 19 also as shown in Fig. 4 is drilled to slidably admit the extension of the shaft 17, the plate 19 being adjustably secured to the top plate 40 by the screw means 21 and providing an adjustment in a lateral direction for the axis of the shaft 17. The base plate 10 is cut-away as shown in Fig. 2 to provide the necessary clearance for the operating components of the stepping mechanism and, to admit of a ready removal of the entire stepping mechanism sub-assembly, the aperture in the plate 10 for the shouldered bushing 17′ is slotted into the cut-away.

The mounting frame 15 is turned perpendicularly in two planes to produce the two brackets 22 and 23, the brackets 22 and 23 also being at right angles to each other. Perpendicularly to the bracket 22 and secured thereto by the screw means 24 is an operating electromagnet 25 having a pole-piece 26 and the terminals 27 to which a source of operating potential, not shown, may be connected. A hinge block 28 having a pair of lugs 29 is securely mounted on the bracket 23 by means of the screws 31 the lugs 29 being drilled to admit a pivot pin 32. An armature 33 is pivoted on the pivot pin 32 by means of a pair of parallel ears 34 turned at right angles from the armature 33, each of the ears 34 being drilled to pivotally pass the pivot pin 32. The armature 33 is so positioned that when the electromagnet 25 is energized by means of said source of operating potential, not shown, the tractive magnetomotive force exerted from the pole-piece 26 will cause the armature 33 to be pivoted about the pin 32 in a clock-wise direction as viewed in Fig. 2. An armature lever 35 is formed by turning a portion of the armature 33 at right angles in an opposite direction from the ears 34. The armature lever 35 is so arranged that as it nears the end of its operating arc due to the said pivot of the armature 33, it will make contact at its extremity with a buffer 36 suitably mounted on one of a pair of contact springs 37. The springs 37 are mounted in a suitably insulated pile-up on the bracket 23 by the screws 38 and are provided with a pair of normally closed contacts 41. A pair of terminals 42 at an extremity of the springs 37 provide a convenient means whereby the contacts 41 may be connected in the energizing circuit, not shown, of the electromagnet 25. The operation of the armature 33 will, in a well-known self-interrupting manner, serve to interrupt the energizing circuit, not shown, of the electromagnet 25 each time that the magnet 25 is energized, with a resulting periodic and continual operation of the magnet 25 and its associated apparatus for as long as the operating potential and its source, not shown, is applied to the magnet 25.

Returning at this point to the shaft 17, a bushing 43′ is rotatably mounted on the shaft 17, which bushing 43′ extends, at one extremity, from the shouldered bushing 17′ to the retaining plate 19, enough clearance being provided to permit the bushing 43′ to be freely rotatable between the bushing 17′ and the plate 19. Rigidly mounted on the bushing 43′, at the bushing 17′ extremity, in any convenient manner such as by pressing, is a ratchet wheel 43 having a plurality of ratchet teeth 44, in my preferred embodiment, 33 in number. Separated from the ratchet wheel 43 by a spacing bushing 45 and mounted on the bushing 43 is a cam wheel 46 having thereon a single cam lobe 47. An additional spacing bushing 49 is provided to properly space the cam wheel 46 from the lower intermediate plate 20. The elements 43, 45, 46 and 49 are rigidly secured on the rotatable bushing 43′ in a manner to be described hereinafter.

The armature 33 is further provided with a right angularly turned extension 50 on the extremity of which is affixed in any convenient manner, a spring retaining means 51. Two further perpendicularly turned portions of the frame 15 provide an additional pair of brackets 52 and 53, the brackets 52 and 53 also being at right angles to each other. Between the former of these brackets, 52, and the retaining means 51 is positioned a helical compression spring 54 with the result that the operation of the armature 33 and its lever 35 from its normal position is always against the bias provided by the compression of the spring 54, this bias also serving to restore the armature 33 and its concurrently operating members to their positions when the electromagnet 25 is de-energized. A compression adjusting means 55 is provided in order to adjust the compression of the spring 54 whenever operating conditions of the stepping mechanism dictate. The adjustment is accomplished by means of a screw 56 extending from the means 55 through an aperture provided in the bracket 52. A nut 57 on the screw 56 may be advanced or retarded to respectively increase or decrease the compression of the spring 54.

Also on the extremity of the extension 50 of the armature 33 is pivotally mounted by means of a pin 58 an operating pawl 59 which pawl is adapted and arranged to engage the teeth 44 of the ratchet wheel 43. A tension spring 60 is extended by any convenient means between the extension 50 and the pawl 59 in such a manner that the pawl 59 will normally be urged into engagement with the teeth 44 of the ratchet wheel 43. Extending from the bracket 53 and mounted thereon by means of a clamping plate 61 and the screws 62 is an arresting means comprising a flat spring 63 suitably formed to clear the extension 50 and operating pawl 59 and also to engage the teeth 44. The flat spring 63 is biased in a manner such that its operating extremity is also normally urged into engagement with the teeth 44. Also on the extension 50 of the armature 33 are formed a pair of teeth 64 having a pitch equal to that of the teeth 44 of the ratchet wheel 43, the said teeth 64 being adapted also to normally engage the teeth 44, however, on a surface of the teeth 44 opposite to that normally engaged by the operating pawl 59 and the flat spring 63.

In a manner well-known in the switching art, when, because of the energization of the electromagnet 25, the armature 33 is operated from its normal position against the bias of the spring 54, the teeth 64 will be moved from engagement with the teeth 44 and the operating pawl 59 will be drawn back, and, because of the tension of the spring 60, will be moved into engagement with the next succeeding tooth 44 in a clockwise direction as viewed in Fig. 2. Upon the subsequent de-energization of the electromagnet 25 the armature 33 will be restored to its normal position as a result of the action of the spring 54 and the operating pawl 59, because of its action on the engaged tooth 44, will cause the ratchet wheel 43, and therefore its associated components the bushing 43′ and the cam wheel 46, to be rotated from one rotary position to the next on the shaft 17 in a counter-clockwise direction as viewed in Fig. 2, the rotation in the instant embodiment of my invention being equal to $1/33$ of a complete revolution.

The flat arresting spring 63 insures that at least this said rotation is accomplished and the teeth 64 insure that only this said rotation is accomplished, for each energization and de-energization of the electromagnet 25.

A pair of normally open springs 65 are mounted by means of an insulated pile-up and the screws 66 to a mounting bracket 67 which bracket extends perpendicularly from the frame 15 and may be affixed thereto in any convenient manner. An extension of one of the springs 65 has a means 68 adapted to engage the cam lobe 47 each time that the ratchet wheel 43 and the cam wheel 46 is rotated to a normal position. The contacts 69 carried by the springs 65 are therefore closed during the period of rotation when the cam wheel 46 is away from its normal rotary position. A pair of terminals 70 provide a means for connecting the contacts 69 in the energizing circuit of the electromagnet 25 whereby the electromagent 25 can be periodically energized and deenergized to rotate the assembly of elements comprising the ratchet wheel 43, the bushing 43′, the cam wheel 46, and the elements 45 and 49, until the said assembly again returns to its normal rotary position, at which time the contact 69 will be opened due to the cooperation of the cam lobe 47 and the springs 65, and the energizing circuit for the electromagent will be permanently interrupted.

Referring now to Figs. 1 and 3 of the drawings, the description of the elements of the above-mentioned assembly will now be completed. Positioned between the top plate 40 and the lower intermediate plate 20 and also mounted on the bushing 43′ is a flat disk 70. A smaller spacing bushing 71 retains the disk 70 an appropriate distance from the bushing 49 and insures the necessary clearance between the disk 70 and the lower intermediate plate 20. At the extremity of the bushing 43′ under consideration, screw threads 72 are provided upon which a suitable tapped bushing 73 may be screwed. Advancing of the bushing 73 securely on the rotatable bushing 43′ by means of the threads 72 serves to clamp rigidly between the ratchet wheel 43 and the bushing 73, the elements 45, 46, 49, 71 and the disk 70, thus uniting these said elements in a single assembly on the bushing 43′, rotatable on the shaft 17 by means of the stepping mechanism subassembly above described. The intermediate plate 30 has a circular cut-out 74 adapted to fit closely around the disk 70, and the plate 30 is adapted to provide clearance between the plates 20 and 40 adequate to permit free rotation of the disk 70 therebetween. The plates 20 and 40 are suitably apertured to freely admit the bushing 71 and 73, respectively. The three plates 20, 30 and 40 thus form a complete enclosure within which the disk 70 can be freely rotated.

The disk 70 is necessarily formed of a non-magnetic material, in the preferred embodiment either aluminum or fiber was proved satisfactory. Inlaid in the disk 70 in radial rows and concentric circles are a plurality of semi-permanent magnet elements 75. The elements 75 may be secured in the disk 70 by staking or any other suitable manner to form a mosaic of magnetic elements in a non-magnetic field. The elements 75 are preferably formed of a low permeability metal such as, for example, the metal known commercially as Alnico V. In this particular embodiment a total of 132 magnetic elements are provided, disposed in 33 of said radial rows, the elements of each radial row lying in each of four concentric circles. Referring to Fig. 3, illustrative radial rows of magnetic elements may be conveniently designated as A1 through A14 as indicated and the elements of each radial row may be designated *w*, *x*, *y*, and *z*, reading radially outward. In this embodiment also, four write-in heads comprising the electromagnets 76*w*, 77*x*, 78*y*, and 79*z* are provided, each of said electromagnets having, respectively, the pole-pieces 80, 81, 82, 83. The electromagnets 76*w*, 77*x*, 78*y*, and 79*z* are conveniently mounted on the base plate 10 with the respective pole-pieces perpendicular thereto, by the screw means such as 84, the pole-pieces extending through apertures provided therefor in the lower intermediate plate 20. The electromagnets 76*w*, 77*x*, 78*y* and 79*z* are so disposed with respect to the plurality of magnetic elements 75 of the disk 70, that the respective pole-pieces of each of the said electromagnets will be individually associated with four radial rows of elements, in this embodiment, each of the said four radial rows of elements being separated by three other of the radial rows. The said pole-pieces of the said electromagnets are further specifically associated respectively with successive ones of each of the aforementioned circular rows of elements. Thus, referring again to Fig. 3, it will be noted that the pole-piece 80 is associated with the element *w* of the radial row A1, the pole-piece 81 with the element *x* of the radial row $A_5$, the pole-piece 82 with the element *y* of the radial row $A_9$, and the pole-piece 83 with the element *z* of the radial row $A_{13}$. As indicated in Fig. 1, the said pole-pieces are slightly undercut to more closely approximate the diameter of the elements 75 in order to more effectively concentrate magnetic inducing flux as hereinafter described. Connecting terminals, not shown, similar to the terminals 27 of the electromagnet 25, are provided for connecting the electromagnets 76*w*, 77*x*, 78*y*, and 79*z* to their respective energizing circuits, also not shown.

An indicator aperture 85 is provided in the top plate 40 and provides, in connection with the indicia 86 on the storage disk 70, a means whereby the rotary position of the storage disk 70 can be visually determined at any given time during the operation of the memory. Thus at the disk 70 is rotated the indicia 86, which are positioned in a circle concentric with the disk 70, will successively appear in the aperture 85.

Read-out means corresponding in number to the write-in means comprises the four contact spring sets 87 through 90, which spring sets are mounted on the top side of the top plate 40 in a conventional spring pile-up by means of the mounting screws 91 and the clamping plates 92. A permanent magnet armature 93, designated 93*w*, 93*x*, 93*y*, and 93*z*, respectively, for each of the spring sets 87 through 90, is mounted on an extension of one spring of each of the said spring sets in any convenient manner. The armatures 93, which are also preferably formed of a low permeability metal such as that known commercially as Alnico V, are so affixed to the said springs and the springs are so disposed with respect to the top plate 40 that the armatures 93 may be conveniently passed through apertures 94 provided therefor in the plate 40 and into association with the magnetic elements 75. The relationship of the elements just described is clearly shown in Figs. 1 and 5. The permanent magnet armatures 93 are so poled that the extremity of the armatures 93 in association with the magnetic elements 75 will normally have like polarity with the closest faces of the elements 75. As a result, the armatures 93 will normally be repelled by the magnetic elements 75. The terminals 95 of the said spring sets are provided to afford means for connecting the read-out means into circuits or apparatus, not shown, using the information to be read out. Each of the said spring sets carries between the individual springs thereof the normally open contacts 96. The spring sets 87 through 90 are disposed on the top plate 40, as shown in Fig. 3, such that the armatures 93 are associated with like elements 75 of the rows of elements as are the pole-pieces 80 through 83, respectively of the write-in heads, but in radial rows of elements 75 following those with which the said pole-pieces are respectively associated when considered from the direction of rotation of the disk 70. Thus, referring to Fig. 3, it is evident that the armature 93$w$ is associated with the element $w$ of the radial row $A_2$, the armature 93$x$ with the element $x$ of the row $A_6$, the armature 93$y$ with the element $y$ of the row $A_{10}$, and the armature 93$z$ with the element $z$ of the row $A_{14}$.

The electromagnets 76$w$ through 79$z$, the respective pole-pieces of which are individually associated with four of the magnetic elements 75, at any given rotary position of the storage disk 70 are individually energizable by connection to energizing circuits not shown, to reverse the normal polarity of the said four magnetic elements 75. Obviously, if the storage disk 70 is rotated step-by-step while the electromagnets 76$w$ through 79$z$ are sequentially and selectively energized various ones of the elements 75 in each radial row $a$ will have their magnetic polarity reversed. The sequence of reversal and combinations of polarity reversal will be described in more detail hereinafter. Those of the elements 75 which have been reversed in polarity will thereafter exert a tractive force to the now oppositely poled armature elements 93 in the case these elements 75 and these said armatures will now be attracted to the reversed elements 75 appearing opposite the armatures 93. Accordingly, as the storage disk 70 is rotated by the stepping mechanism, the four armatures 93$w$ through 93$z$ will be selectively attracted to the elements 75 in the sequence corresponding to the sequence and selective energization of the electromagnets 76$w$ to 79$z$ to operate the respective contact springs. The magnetic circuit through which the magnetic flux of the permanent magnet armatures 93 is operative with respect to the flux of the reversed polarity elements 75 is traceable partially through air and thence through the enclosing plates 40, 30, and 20 of the apparatus framework.

An alternate means of armature organization and structure is shown in section in Fig. 5A. In this figure the armature 93' is shown as enclosed by a cup 97' which cup is formed of a soft, high permeability metal and extended the full length of the armature 93'. The aperture 94 in the top plate 40 is of sufficient diameter to closely admit the cup 97'. With this modification in the armature structure a more effective use can be made in the magnetic flux of the permanent magnet armatures 93' and the flux of reversed elements 75, there being in this case provided a virtually closed magnetic circuit to concentrate the lines of magnetic force.

During the relatively fast stepping of the mechanism to rotate the storage disk 70, the normally repelled armatures 93 may tend to vibrate as the repelling force of the elements 75 varies from a peak at the element 75 to a minimum at the intervals between the elements 75. To prevent this vibration and thereby preclude the possibility of the armatures 93 closing the contacts 96 at undesired times, a backing spring 98 is included in the mounting pile-up, this spring 98 permitting a movement of the operating spring of the spring set from a normal position in one direction only.

In the preferred embodiment of my invention, in which each radial row comprises four magnetic elements 75 each radial row is therefore capable of representing 15 different combinations of magnetically reversed elements 75, as was stated generally earlier herein. Each of the said 15 different combinations will then be representative of a different item of information to be stored. Thus in this embodiment 33 items of information may be stored, each of the items being selectable from 15 different ones of such items of information. However, one of the contemplated uses of my invention demands only that the different items of information in each radial row be selectable from only ten such items and it is in connection with such a use that the storage of an illustrative group of items of information will be described.

Up to this point the storage of information in my invention has been referred to under the assumption that discrete items of information could be stored in successive radial rows of the elements 75. However, such an arrangement, although readily feasible in this embodiment, could perhaps prove inconvenient from the view-point of the disposition and isolation of the electromagnets 76$w$ through 79$z$. For this reason, in accordance with the disposition of the write-in electromagnets 76$w$ through 79$z$ and the readout armatures 93, each of the four elements 75 bearing the individual items of information will not be the elements 75 as already physically arranged in radial rows but rather the four information bearing elements 75 which bear the separate items of information will be arranged in a spiral curve determined by the general equation $r=-A\theta$. In other words so that mounting space can be better utilized, instead of the four magnets being mounted in a straight radial row they are offset radially as illustrated so that the first code for instance is set up as described in $w$ of row $a_1$, $x$ of $a_5$, $y$ of $a_9$ and $z$ of row $a_{13}$.

In one of the uses contemplated for my invention the items of information which it is desirous of storing may be any one of the digits 1 through 9, and 0. For this purpose any digit to be stored is translated in the well-known $wxyz$ code, which code is also employed in the arrangement shown in my copending application Ser. No. 521,689, filed July 13, 1955. In this code the ten digits are translated into the said code as follows:

| | |
|---|---|
| 1 | wx |
| 2 | wy |
| 3 | wz |
| 4 | xy |
| 5 | xz |
| 6 | yz |
| 7 | w |
| 8 | x |
| 9 | y |
| 0 | z |

To describe the operation of my invention in storing items of information, in this case, digits, the storage of a series of digits, 549–0875, in terms of the above $wxyz$ code will be illustrated with reference to the diagram of Fig. 6. In that diagram it will be noted that the storage disk 70 has been rotated from its normal position to position 7 as indicated by the indicia 86, indicating that seven digits have been stored.

In order to store the above digits in accordance with the above described code, when the storage disk 70 is in the rotary position 1, the write-in electromagnets 77$x$ and 79$z$ are energized by the selective energizing of control circuits, not shown, to reverse the magnetic polarity of the elements 75 momentarily associated with these said electromagnets, to store the digit "5." The energizing circuit for the electromagnets is then broken and the stepping mechanism, under the control of the electromagnet 25, causes the storage disk 70 to be rotated one rotary position in a counter-clockwise direction as viewed in Fig. 2 to thereby bring a new group of four magnetic elements 75 under the pole-pieces 80 through 83 of the respective electromagnets. The digit "4" is similarly stored by energizing the electromagents 77$x$ and 78$y$ in accordance with the described code. The storage disk 70 is again rotated and the digit "9" is stored in a new group of four magnetic elements 75 by the energization of the single electromagnet 78$y$ in accordance with the code. The remaining digits of the illustrative series are stored in an identical manner, i.e., by the energization of the proper electromagnets in accordance with code, alternating with the rotary stepping operation of the stepping mechanism to succesively bring new groups of magnetic elements 75 into association with the electromagnets 76$w$ through 79z. When all of the digits of the illustrative series have been stored in the manner indicated above, a pattern of reverse magnetization of the elements 75, as indicated in Fig. 6 by suitable shading to represent magnetically reversed elements 75, will be produced.

Thus, referring to Fig. 6, the first group of magnetic elements 75 bearing, in the *wxyz* code the digit "5," will lie on the curve 100 and will include the element *w* of the radial row $A_1$, the element *x* of the radial row $A_5$, the element *y* of the radial row $A_9$, and the element *z* of the radial row $A_{13}$. Thus in accordance with the *wxyz* code the *x* and *z* elements of the radial rows $A_5$ and $A_{13}$, respectively, alone have their magnetism reversed as indicated by the shading. Correspondingly, the group of magnetic elements 75 bearing in code the digit "4" will comprise the element *w* of the radial row $A_2$, the element *x* of the radial row $A_6$, the element *y* of the radial row $A_{10}$, and the element *z* of the radial row $A_{14}$; of these elements, the elements *x* and *y* are shown in reversed polarity in accordance with the digit "4" code. The digit "9" may similarly be identified in the diagram of Fig. 6 when read in the above code. Thus the polarity of the *y* element alone is reversed of the group of elements comprising the element *w* of the radial row $A_3$, the element *x* of the radial row $A_7$, the element *y* of the radial row $A_{11}$, and the element *z* of the radial row $A_{15}$. The remaining digits of the illustrative series are also represented in the diagram of Fig. 6, and may be identified in the manner described for the first three digits in the foregoing.

It should again be clearly understood that although in the preferred embodiment the arrangement of the magnetic elements 75 utilized, is the arrangement along the curves above described, obviously the arrangement of the elements 75 along the radii can equally readily be utilized. In the latter case it is necessary to also rearrange the electromagnets 25 and the armatures 93 to cooperate with elements as arranged along the said radii.

When the storage operation has been accomplished and the information which one is desirous of storing has been introduced into the storage disk 70 in the manner and in code as described above, the energizing circuits, not shown, for the electromagnets 76w through 79z are opened and the said electromagnets will be ineffective to reverse the polarity of any further magnetic elements 75. At such time as it is desirous of making available the information stored additional control apparatus and circuits, not shown, with which the present invention may be used, can be controlled to operate the electromagnet 25 which, by means of the associated stepping apparatus described above, will cause the storage disk 70 to be rotated in the counter-clockwise direction as viewed in Fig. 3. When the first spiral group of magnetic elements 75 appears under the similarly arranged read-out armatures 93, the particular armatures 93 associated with the elements 75 which bear the coded reversed magnetizations representing a digit or other item of information, will be attracted to these last-mentioned elements 75 and the contacts 96 of the particular armatures will be closed. In this manner, the associated circuits, not shown, in which the particular contacts appear can be used to control apparatus, also not shown, in accordance with the digit or other item of information stored. Thus, in connection with the illustrative series of digits stored as represented in Figs. 3 and 6, the particular armatures 93x and 93z will be attracted to the elements *x* and *z* of the radial rows of elements designated as rows $a_3$, $a_5$, $a_9$, and $a_{13}$. After each digit or item of information has been "read-out" by the operation of the particular armatures 93 operated, the stepping mechanism will advance the storage disk 70 one rotary position thereby bringing a new group of information bearing elements 75 into cooperation with the armatures 93. The group of elements 75, the information of which has in the preceding rotary position, been "read-out," will be advanced again into association with the electromagnets 76w through 79z and, by means of an appropriate control of the respective energizing circuits, not shown, the current through the electromagnets 76w through 79z may be reversed thereby restoring the magnetic elements 75 of the particular group to their normal polarity. The information originally introduced into this particular group of elements by reversing the magnetic polarity thereof will thereby be effectively erased and the elements 75 of this group will again normally repel the armatures 93 of the read-out means.

Although the erasing of the stored information has been described as occurring after each successive "read-out" operation, the energization of the electromagnets 76w through 79z may be so controlled that no reversal of the polarity of elements 75 back to the normal polarity takes place, in which case the items of information of a more permanent nature stored in the storage disk 70 may be repeatedly used in cycles to operate associated circuits and apparatus, not shown, in accordance with the permanent information stored. In addition, the write-in electromagnets 76w through 79z may be so arranged with respect to the read-out armatures 93w through 93z that a group of permanent magnets, *w*, *x*, *y*, and *z*, respectively, are interposed between the said write-in and read-out means. In the latter obvious modification the erasing function is accomplished by the properly poled permanent magnets as the storage disk is rotated, the electromagnets 76w through 79z in this case functioning only to write-in the information desired. This expediency is not shown in the drawings, it being considered as constituting an obvious modification to any one skilled in the art.

To complete the description of the structural details of my invention, a dust-cover 101, preferably of a transparent material is provided to protect the mechanically moving elements. The cover 101 may be secured to the top plate 40 in any convenient manner, such as by the spring clips 102, which clips in turn may be secured to the underside of the lower intermediate plate 20 by the screw means 103. The cover 101 may be conveniently milled as shown in 104 to admit the spring clips 102 to locate as well as to secure the cover.

What has been described is considered to be the preferred embodiment of my invention and it is to be understood that modifications may be made in the structure and organization of my invention in addition to those described without departing from the spirit thereof as defined in the appendant claims.

What is claimed is:

1. A magnetic memory device for storing digital information in a combinational code, said device comprising a non-magnetic disk having a plurality of sets of semi-permanent magnetic storage elements mounted therein in concentric circles of different radii, said elements having their axes perpendicular to the plane of said disk so as to present their magnetic poles at the opposite sides thereof, a set of write-in electromagnets extending perpendicularly of said plane on one side only of said disk and disposed each opposite a different one of said concentric circles of elements, a set of read-out contacts, an associated set of permanent magnets each extending, and each being mounted in mechanically engaging relation with the associated contact for movement, perpendicularly of said plane on the other side only of said disk, said permanent magnets being disposed in circumferentially staggered relation to said electromagnets and each opposite a different one of said concentric circles of elements, means for rotating said disk in a stepwise manner so as to successively align said sets of magnetic elements first with said set of electromagnets and subsequently with said set of permanent magnets, said electromagnets being selectively energized so as to magnetize the individual magnetic elements of each set aligned with said electromagnets in a selected combination of one and the other magnetic polarity, and said permanent magnets upon alignment with said set of magnetized elements being attracted and repelled respectively by said elements, and the associated contacts being actuated, in corresponding combinations for directly reading out the information stored in said elements.

2. A magnetic memory device as claimed in claim 1, wherein said electromagnets are selectively energized to magnetize predetermined ones of said set of elements according to one polarity, wherein said rotating means after read-out by said armatures of the information stored in said elements are effective to bring said set of elements into alignment with said set of electromagnets, and wherein said electromagnets are then energized to magnetize all the elements of said set according to the other polarity, whereby the information stored in said elements is erased and all said elements are pre-magnetized according to the last-mentioned polarity, in preparation of the next cycle of operation.

3. A magnetic memory device as claimed in claim 1, wherein said disk is mounted for rotation within an enclosure of magnetic material, said enclosure comprising a flange portion peripherally of said disk and two plate portions, one on each side of and adjacent said disk, one of said plate portions having openings therein for exposing to said electromagnets a single one of said sets of magnetic elements at a time and the other plate portion having openings therein for exposing said permanent magnets another single one of said sets of magnetic elements at a time, the remaining magnetic elements being, in effect, magnetically short-circuited by said enclosure.

4. A magnetic memory device as claimed in claim 3, wherein said electromagnets, as well as the corresponding openings in said first plate portion, are disposed in circumferentially staggered relation to each other, and wherein said permanent magnets, as well as the corresponding openings in said second plate portion, are disposed in circumferentially staggered relation to each other and also to said electromagnets and their plate openings.

References Cited in the file of this patent

UNITED STATES PATENTS

| | | |
|---|---|---|
| 2,144,844 | Hickman | Jan. 24, 1939 |
| 2,310,138 | Whittaker | Feb. 2, 1943 |
| 2,416,445 | Jensen | Feb. 25, 1947 |
| 2,764,463 | Lubkin et al. | Sept. 25, 1956 |
| 2,770,796 | Boer | Nov. 14, 1956 |
| 2,784,851 | Bretschneider | Mar. 12, 1957 |